Aug. 9, 1932.
J. E. BRYAN
1,871,254
LIQUID SEPARATOR
Filed May 21, 1931
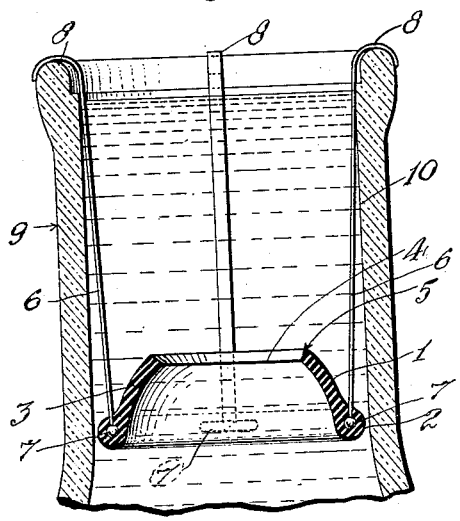
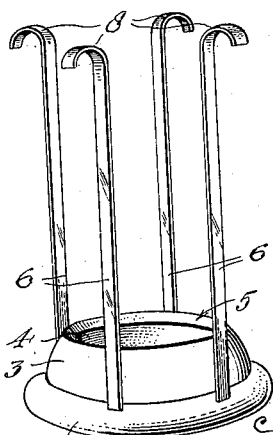
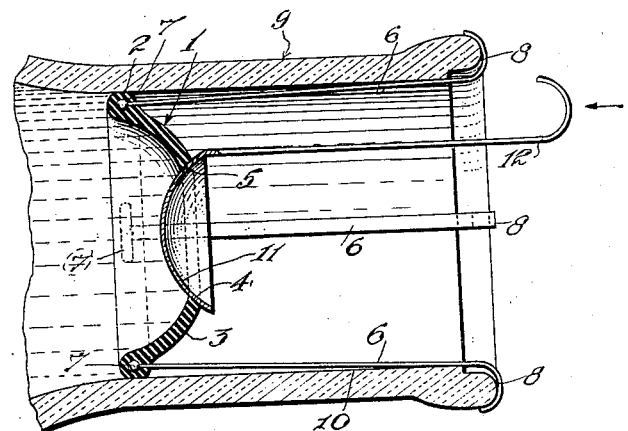
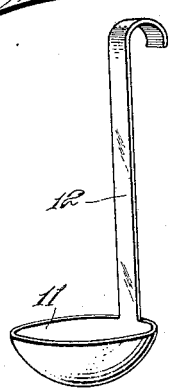
Inventor:
James E. Bryan,
By Everett & Rook,
Attorneys.

Patented Aug. 9, 1932

1,871,254

UNITED STATES PATENT OFFICE

JAMES E. BRYAN, OF NEWARK, NEW JERSEY

LIQUID SEPARATOR

Application filed May 21, 1931. Serial No. 538,904.

This invention relates in general to a device for separating liquids of different specific gravities, for example for separating cream from milk.

One object of the invention is to provide a novel and improved device of this character, including an expansible part having an opening therethrough to be inserted into a container for the liquids to be separated, and means for expanding said part into contact with the walls of the container and closing said opening, whereby the uppermost liquid, for example the cream on a milk bottle, may be removed from the container independently of the lower liquid, for example the milk.

Other objects are to provide a device of the character described comprising an annular radially expansible body or valve seat of a diameter somewhat less than the diameter of a container in which it is desired to separate liquids, and means such as a valve or plunger for simultaneously closing the opening through the annular body and expanding said body outwardly into contact with the walls of the container; to provide such a device in which means is provided for supporting the annular body on the rim of the container to hold it against movement into the container, in combination with a member to overlie the edges of the opening through the body and adapted to be pushed against said body in the line of axis of the opening therethrough so as to simultaneously close the opening and expand the body into contact with the walls of the container; and to obtain other advantages and results as will be brought out in the following description.

Referring to the accompanying drawing, in which corresponding and like parts are designated throughout the several views by the same reference characters, Figure 1 is a transverse vertical sectional view through the body part or valve seat of a device embodying my invention, showing it mounted in a container which is fragmentarily illustrated;

Figure 2 is a similar view showing the body expanded into contact with the walls of the container and the opening through the body closed, so that the liquid above the body can be poured from the container independently of the liquid below the body;

Figure 3 is a detached perspective view of the body part, and

Figure 4 is a detached perspective view of the plunger or valve.

Specifically describing the illustrated embodiment of the invention, the reference character 1 designates the expansible body part of the device which is annular in shape or has a substantially axial opening therethrough. For example, this body part may be the frustum of a hollow cone or a segment of a hollow sphere, as shown. The body part includes a rim 2 of a diameter somewhat less than the diameter of the container in connection with which the device is to be used, and side walls 3 which are preferably inclined or curved inwardly of the rim at one side thereof, the ends of the walls 3 providing an axial opening 4, the edges of which are preferably beveled as at 5. This body part is formed of some expansible material, for example rubber, and has embedded or otherwise suitably secured thereto a plurality of hangers 6. These hangers are preferably formed of strip material and have heads 7 at one end embedded in the body part 1 while the other ends are outwardly bent at 8 to take over the rim of a container. In the present instance this container 9 is shown in the form of a milk bottle having a cylindrical neck portion 10 of a length substantially equal to the usual depth of the layer of cream which forms in a milk bottle. The hangers 6 are also preferably of a length corresponding to the depth of the upper layer of liquid which it is desired to remove.

Cooperating with the body part 1 is a part 11 which is shown as concavo-convex in transverse section and provided with a handle 12. The part 11 is of a diameter somewhat greater than the diameter of the opening 4 in the body part, and the handle 12 is of a length somewhat greater than the distance between the body part 1 and the rim of the container when the body part is mounted in the container.

In operation of the device, the body part 1 is slowly slipped into the neck of the container, with the walls 3 facing the mouth of the container, until the hooked ends of the hangers contact with the rim of the container, as shown in Figure 1 of the drawing. Thereupon, the part 11 is inserted into the container by means of the handle 12 and the convex side of the part 11 is pressed against the edges of the opening 4 in the body part so as to radially expand the rim of the body part into contact with the walls of the container, as shown in Figure 2 of the device. The container may then be turned or partially inverted, as shown in Figure 2 of the drawing, so that the upper layer of liquid or cream may be poured from the container, while the lower layer of liquid or milk is prevented from flowing from the container and mixing with the upper layer. After the upper layer of liquid has been removed, the container is again placed in upright position, the part 11 removed, and the body part 1 slipped outwardly of the container.

It will be observed from the foregoing that the body part 1 serves as a valve seat, while the part 11 in effect constitutes a valve or plunger which at the same time serves to close the opening 4 and expand the body part into contact with the walls of the container. The inclined walls 3 of the body part enable the body part to be made light in construction and easily expansible, although obviously these walls might be dispensed with by making the rim 2 somewhat heavier and beveling the inner periphery of the rim to receive the valve or plunger 11. The body part 1 and the part 11 together serve as a plug when inserted into a container.

While I have shown and described the invention as embodied in certain details of construction, it should be understood that this is primarily for illustrating the principles of the invention, and that many modifications and changes may be made in these details without departing from the spirit or scope of the invention.

Having thus described the invention, what I claim is:

1. A device for separating liquids in a container, comprising an expansible member having an opening to be inserted into a container, and means for simultaneously closing said opening and expanding said member in said container into contact with the walls of the container.

2. A device for separating liquids in a container, comprising an annular expansible member to be inserted into a container, and means to tightly contact with the inner walls of said member and expand said member in said container into contact with the walls of the container.

3. A device for separating liquids in a container, comprising an expansible member having an opening to be inserted into a container, means for supporting said member from the rim of said container, and a plunger to tightly fit said opening and simultaneously close the opening and expand said member into contact with the walls of said container.

4. A device for separating liquids in a container, comprising a member of expansible material having an axial opening to be inserted into a container, hangers attached thereto to take over the rim of the container for supporting said member in the container, and a plunger to tightly close said opening and expand said member into contact with the walls of said container.

5. A device for separating liquids in a container, comprising a circular member of rubber having an axial opening to be inserted into a portion of a container circular in cross-section, hangers each having one end embedded in said member and the other end hooked to take over the rim of the container and support said member in the container, and a plunger to tightly close said opening and simultaneously expand said member into contact with the walls of the container.

6. A device for separating liquids in a container, comprising an annular expansible member to be inserted into a container, means for supporting said member from the rim of the container, and a plunger to perimetrally tightly contact with the inner walls of said member and expand said member in said container into contact with the walls of the container as said plunger is pushed against said walls.

JAMES E. BRYAN.